J. C. BERTSCH.
COMBINATION STOCK AND FREIGHT CAR.
APPLICATION FILED SEPT. 24, 1912.

1,056,489.

Patented Mar. 18, 1913.

UNITED STATES PATENT OFFICE.

JOHN CHARLES BERTSCH, OF FORT WORTH, TEXAS, ASSIGNOR TO STANDARD GENERAL SERVICE CAR COMPANY, OF FORT WORTH, TEXAS, A PARTNERSHIP COMPOSED OF TOM B. OWENS, EVERETT WYATT, AND JOHN CHARLES BERTSCH, ALL OF FORT WORTH, TEXAS.

COMBINATION STOCK AND FREIGHT CAR.

1,056,489.  Specification of Letters Patent.  Patented Mar. 18, 1913.

Application filed September 24, 1912. Serial No. 722,083.

*To all whom it may concern:*

Be it known that I, JOHN C. BERTSCH, a citizen of the United States, residing at Fort Worth, in the county of Tarrant and State of Texas, have invented certain new and useful Improvements in Combination Stock and Freight Cars, of which the following is a specification.

This invention relates to stock cars and means for converting a stock car in part or as a whole into a freight car.

The object of this invention is to provide cheap and practical means which may be applied to stock cars, whereby a stock car can be readily and quickly converted into a freight car, or into a car of which one part is a freight car and the other part is a stock car, without much manual labor.

Another object of this invention is to provide means for the conversion of a stock car, in part or as a whole, into a freight car, which can be applied to any kind of underframe; which occupy but little of the useful space of a car, and which are safe, durable and quickly repaired.

Still another object of this invention is to provide such means for the conversion of a stock car, in part or as a whole, into a freight car, which form a complete closure which is tight against dirt, sparks, cinders and the atmospheric elements; and which secure permanently clean surfaces for the inside of a stock car while same is used as a freight car.

Other objects as well as the advantages of different forms of attachments to stock cars will be fully explained in the following specifications and claims.

To overcome the expense of returning empty stock cars, and to increase the utility of the rolling stock, many attempts have been made to construct so-called general service cars, or to provide stock cars of ordinary construction with attachments for the conversion of a stock car into a freight car. However, all such attempts have failed in practice, so far as I know, because the construction did not fill the requirements of a freight car with reference to cleanliness, durability, simple handling and repairing.

A stock car, when converted into a freight car, must be tight against sparks, cinders, rain and snow, and as the inside surfaces of a stock car become soiled by the animals and their excrements, they can not be used for shipping freight. The rough usage of railroad rolling stock forbids the use of attachments for the conversion of a stock car into a freight car, which consists of more or less delicate parts or such which require a certain degree of precision and alinement for their operation. The means employed for such purposes must be simple, cheap, safe and flexible, and they must permit easy and quick repairing everywhere. All of these requirements are met with in this invention in a high degree, by providing within a stock car of ordinary construction a complete covering of the inside surfaces, consisting of folding or sliding sheets for the sides, sliding sheets for the ends, and a sectional cover for the floor of the car.

The sheets forming the side covers are hinged to the floor covers, or if the latter are not desired, to connecting bars, which are provided with chains, ropes or cables, with a pulling arrangement and with a lifting mechanism, for the simultaneous raising or lowering of the entire inside covering of a stock car.

For shipping live stock, the entire inside covering is placed underneath the roof of the car, and for shipping freight of any kind, the entire inside covering is simultaneously lowered, thereby converting a stock car into a freight car. By lowering only one half of the inside covering, one half of the car may be used as a freight car while the other half is used as a stock car. By removing the side and end covers, or the side covers only, a stock car may be used as a double deck car by simply lowering the movable floor only to one half the height of the car, whereby either half of the car may be used as a double deck car while the other half is used as an ordinary stock car.

The entire inside covering may be made of wood or metal, and the shape and construction of the several parts may differ materially in order to provide suitable arrangements for different classes of freight as well as for different constructions of stock cars, without departing from the principal features of this invention.

Reference is had to the accompanying drawings which form a part of this specification, and in which similar characters of reference indicate the same parts throughout the several views.

All attachments of this invention are symmetrical on both sides of the longitudinal and cross center lines x—x and y—y, and therefore all plans and sections of the drawings show only one half of the attachments.

In the drawings Fig. 19 is a horizontal section, and Fig. 20 an elevation of a locking device for the side covers. Fig. 21 is a vertical cross section showing another form of sliding covers. Fig. 22 is a vertical cross section, Fig. 23 an elevation, and Fig. 24 a horizontal cross section of one form of a convertible door construction. Figs. 26, 27 and 28 are details of the door shown in Fig. 25.

Figures 7, 8, 9, 10, 11, 12, 13, 14:
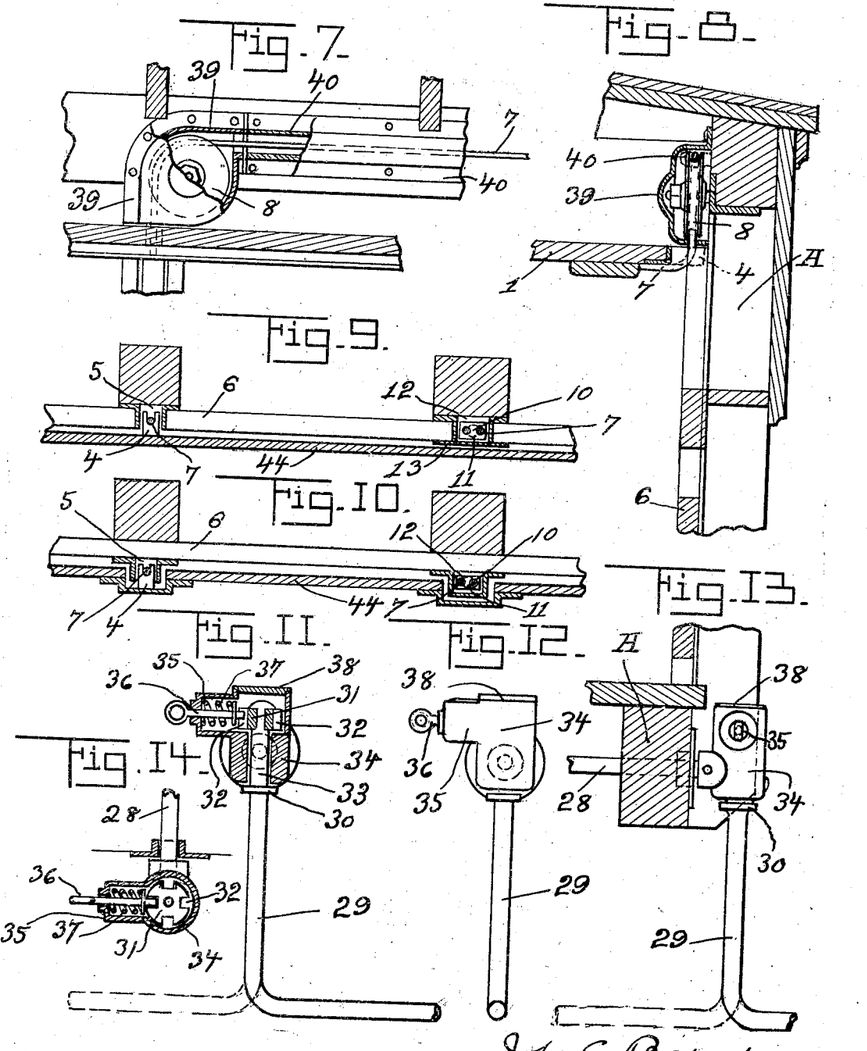
Fig. 7 is a detail view and part section of a cable sheave with guard and cable covers.
Fig. 8 is a vertical cross section showing cable sheave and cover.
Figs. 9 and 10 are horizontal detail sections through a part of the sides of a stock car, showing different constructions of cable grooves.
Figs. 11, 12, 13 and 14 are detail views and sections of a reversible crank for operating the lifting mechanism.
Figure 15:
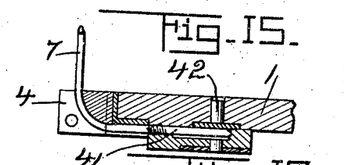
Figs. 15 and 16 are detail sections showing connections of cables to floor covers.
Figures 16, 18:
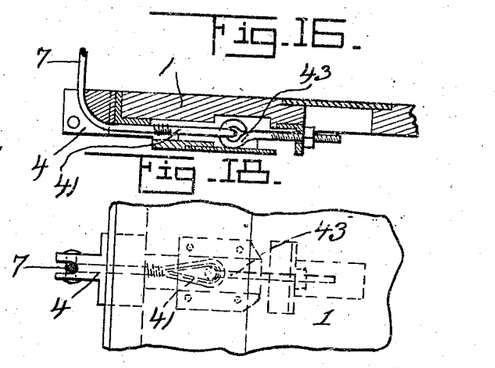
Figs. 17 and 18 are plan views of Figs. 15 and 16.
Figure 17:
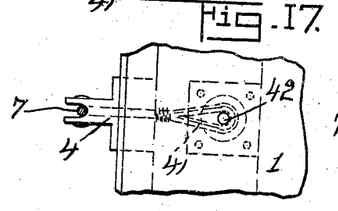

Referring to the drawings, "A" represents the complete body of a stock car of ordinary construction, consisting of the underframe with permanent floor, the body framing with sides, ends and roof. Two independent halves of floor covers 1 are used for connecting and operating the side and end covers, and if floor covers 1 are not desired, the frames 2 with braces 3, shown by Fig. 6, take the place of the floor covers 1. Each half of floor covers 1 or frames 2 is provided with four or more guide blocks 4, shown by Figs. 2, 8, 9, 10 and 15 to 18 inclusive, which are slidable within grooves 5, which are formed by suitable steel shapes and fastened preferably directly to the body framing in order to make them flush with the slats 6 of a stock car, as shown throughout the drawings and in detail by Fig. 9. The steel shapes forming grooves 5 may also be fastened upon the permanent slats 6 of a stock car, as shown by Figs. 10, 19 and 20. The guide blocks 4 form also guards for the flexible members 7 which are fastened to floor covers 1 or frames 2, as shown by Figs. 15 to 18. These flexible members 7 may be either chains, ropes, or preferably cables, and being a part of the pulling arrangement, they pass within grooves 5 up to and over sheaves 8 which are attached to the top plate of a stock car, and then over sheaves 9 to a pulling block 10, which forms the connection between members 7 and the flexible main pull or cable 11, which is similar to but much stronger than the flexible members 7, and connects with the lifting mechanism for the raising and lowering of the inside covering of the stock car.

Figure 1:
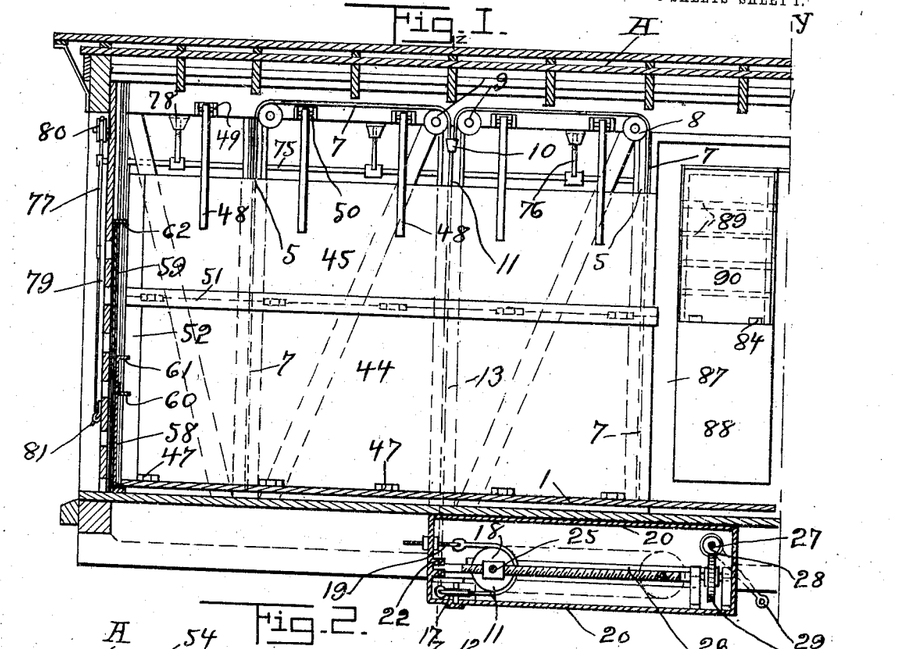
—Figure 1 is a half longitudinal section along the center line x—x of Fig. 2, of a stock car equipped with all the attachments of this invention, showing the inside covering lowered for shipping freight.
Figure 2:
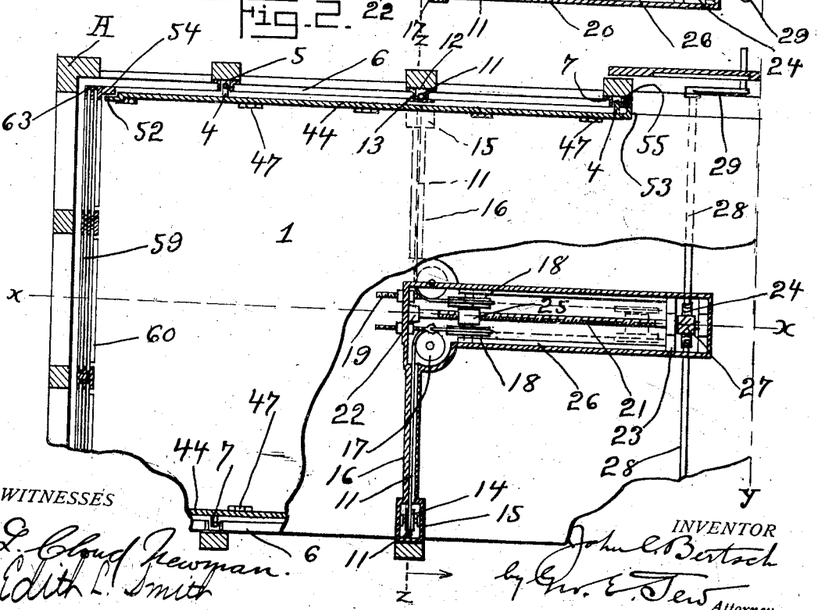
Fig. 2 is a half plan view of a stock car as shown in Fig. 1, with the roof removed and a part of the movable and permanent floors cut away for showing a plan of the lifting mechanism.
Figures 3, 4, 5, 6:
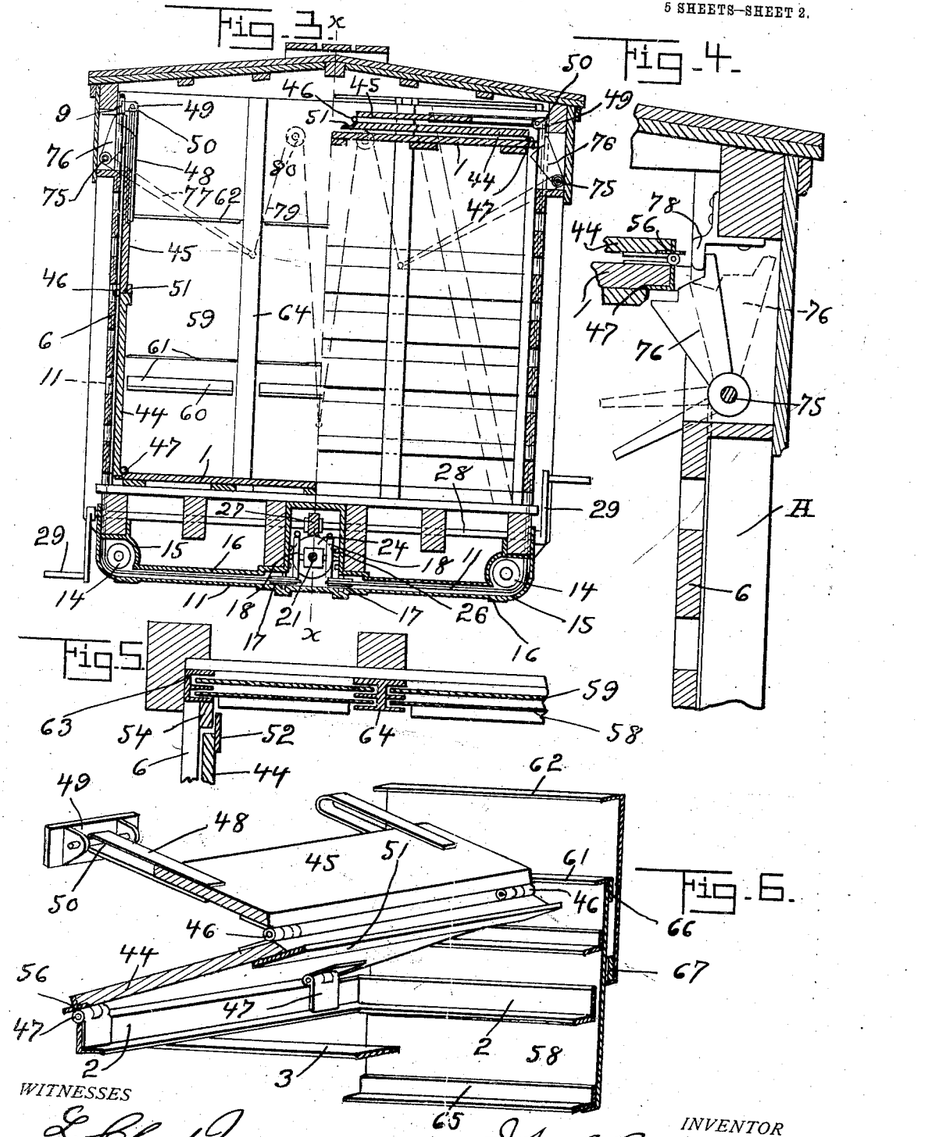
Fig. 3 is a cross section along line z—z of the stock car shown by Figs. 1 and 2, looking in the direction indicated by arrow points. One half showing the inside lowered for shipping freight, and the other half showing the inside covering placed underneath the roof for shipping live stock.
Fig. 4 is a vertical detail section showing the safety device for holding up the inside covering.
Fig. 5 is a horizontal detail section showing one form of sliding covers.
Fig. 6 is an isometrical view of a part of the inside covering of a stock car without floor covers.

Pulling blocks 10 with main pulls 11 are movable up and down within main grooves 12, which are closed by covers 13 as shown by Fig. 9, or made of semi-box shapes as shown by Fig. 10, for keeping them free from dirt as well as for protecting the main pulls 11. Main pulls 11 pass through the permanent floor of a stock car, underneath of which they pass first over vertical guide sheaves 14, which are inclosed in sheave boxes 15, thence through tubes 16 and over horizontal guide sheaves 17, and finally over main sheaves 18, terminating in the adjustable eyebolts 19, as shown by Figs. 1, 2 and 3. Tubes 16 connect sheave boxes 15 with casing 20, which contains the lifting mechanism and is preferably located between the two center-sills of the underframe. If the underframe has only one center-sill, casing 20 is located on the side of the sill opposite the location of the air brake cylinder. If the construction of the underframe or any other obstacle forbids the use of one centrally located casing 20, two such casings, one located at each outside sill of the underframe may be used, and both casings 20 operated by one common crank shaft.

The lifting mechanism within casing 20 consists of a screw 21 of which one end is pivoted in bearing 22 and the other end carried by bearings 23. To screw 21 is rigidly connected a worm or spiral gear 24, which is located between bearings 23. A crosshead 25 with an internal thread to fit the thread of screw 21, and with a pin on each side for the reception of the sheaves 18, is carried by screw 21 and guided horizontally by guides 26 during its travel between bearings 22 and 23.

A worm or spiral 27, mounted rigidly upon a shaft 28 which extends over the whole width of the car, as shown by Fig. 3, and which carries at each end a crank 29, and which engages with gear 24 and causes the screw 21 to turn either way according to the turning of the cranks 29. For the perfect lubrication of all parts of the mechanism, the casing 20 is filled with oil up to centerline of screw 21, which permits the oil to reach sheave boxes 15 through tubes 16 keeping the main pulls 11 soaked in oil, and preventing the oil running through the bearings of shaft 28.

Each independent half of the inside covering of the stock car is provided with a complete lifting mechanism, so that the attachment in one half of a stock car can be operated independently of the other half. As the entire weight to be lifted is placed upon crosshead 25 which can not turn, the lifting mechanism is self-locking in any position it may be left by resting cranks 29. It is apparent that by turning cranks 29 the driver 27 turns the driven gear 24, and with it the screw 21, thereby causing the crosshead 25 together with sheaves 18 to travel forward or backward, depending upon the turning of the cranks, and consequently causing the pulling blocks 10 to travel upward or downward, which results in the lowering or raising of floor covers 1 or frames 2 with all the side and end covering connected to them or being operated by them. The main pulls 11 are shown strung around sheaves 18 in two plies, which makes the travel of crosshead 25 one half of the distance the pulling blocks 10 must travel to place the entire inside coverings at their lowest and highest positions. If the travel of crosshead 25 as well as the length of casing 20 must be shortened for want of space or any other reason, one or two more pairs of sheaves 18 may be placed upon crosshead 25 and the main pulls 11 strung in three or four plies, without departing from the system of the lifting mechanism.

The handles of cranks 29 cannot project beyond the limit width of the car while the car is moving, and to prevent loss of cranks 29 they must be rigidly connected to shafts 28. These requirements make a reversible crank handle necessary. The straight part of cranks 29 is provided with a shoulder 30 and with a head 31 with notches 32, which forms a neck 33 turnable within the lower part of hub 34, which is rigidly connected to shaft 28. The upper part of hub 34 forms a housing for notched head 31, and is provided on one side with a spring housing 35 which holds a pin 36 with a spring 37, hub 34 being closed on top with a cover 38.

Spring 37 presses pin 36 into one of the notches 32, holding crank 29 in any desired position. By pulling pin 36 outward, crank 29 can be turned and the handle placed as required for any purpose, as shown by full and dotted lines of Figs. 11, 12, 13 and 14. For keeping the flexible members 7 within the grooves of sheaves 8 and 9 and for protecting sheaves 8 and 9 from dirt and damage, guards 39 are provided as shown by Figs. 7 and 8. These guards 39 are on their inside closely fitted to the largest circumference of that part of sheaves 8 and 9 which carries the flexible members 7, preventing them from coming out of sheaves 8 and 9 when the pulling arrangement may become slack. Similar guards may be provided for sheaves 18, and the sheave boxes 15 as well as the casing inclosing sheaves 14 are likewise fitted to sheaves 14 and 17 for keeping the main pulls 11 within their grooves under all conditions. The flexible members running between sheaves 8 and 9 are protected by covers 40, and guards 39 as well as covers 40 are flanged and screwed to the top plate of the body framing of a stock car, as shown by Figs. 7 and 8.

Figs. 15 to 18 inclusive show the fastening of the flexible members 7 to the floor covers 1. A link or loop 41 is provided at the end of the members 7, which is held to floor cover 1 either by a pin 42 or by an eyebolt 43, of which the latter permits a close adjustment of the length of the members 7.

*Side and end covers.*—Flat sheets 44 and 45 of the entire length from door to end of a car are made foldable by hinges 46, as shown by Figs. 3 and 6. At their bottom, sheets 44 are hinged by hinges 47 to floor covers 1 or frame 2, and the top of sheets 45 is provided with straps 48, which form with brackets 49 and pins 50 a loose hinge by which sheets 45 are hung to the top plate of a stock car. Sheets 44 have along their top edge a joint covering plate 51 which overlaps sheets 45, and the ends of sheets 44 and 45 are provided with plates 52 and angles 53 for overlapping the corner strips 54 and door corners 55 respectively, in order to form a tight closure against dirt and rain. Sheets 44 have along their bottom edge a shape 56 for closing against floor covers 1 or frames 2. The straps 48 are loose on pins 50 to avoid any strain on the covers 44 and 45 or on the hinges 46 and 47 through the swinging of the car while in motion, and primarily to assist in the start of the inward folding of the side covers. While the car is converted into a freight car, with all the inside covers down, the straps 48 do not rest upon the pins 50, but their tops are a few inches longer, allowing the entire weight of the inside covering to rest upon the permanent floor of a stock car.

Figures 19, 20, 21:
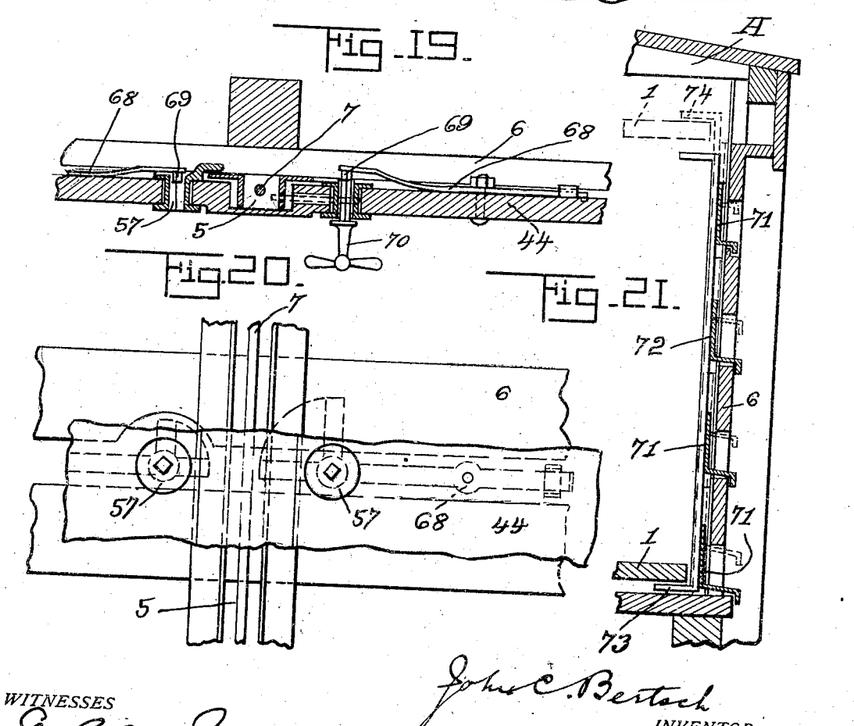

For raising the inside covering, the latches 57, which may be placed in any number on either one or both of the covers 44 and 45, are turned open to disconnect them from the shapes forming the grooves 5, as shown by Figs. 19 and 20. Then the side covers 44 and 45 are pulled inwardly till the straps 48 rest upon pins 50, which causes the covers 44 and 45 to form a wide angle, preventing them by their own weight from going back to a vertical position, and which places during the raising of the entire covering, a part of the weight upon the top plates of a stock car. With the side covers in the position just described, the lifting mechanism can be operated by turning cranks 29 until the entire inside covering is in its highest position under the roof of a stock car. During the raising of the folding side covers 44 and 45, the sliding end covers 58 and 59, of which any desired number can be used, rest in their lowest position until angle 60 of covers 58 rests upon floor covers 1 or frame 2, when covers 58 start to move upward, carrying with them covers 59 by means of the angles 61 and 62. Covers 58 and 59 slide within grooves 63 and 64 and lap over each other for closure against dirt and rain, as shown by Figs. 1 to 6 inclusive. During the lowering of the entire inside covering of a stock car by turning cranks 29 in the opposite direction, folding covers 44 and 45 open up or unfold, and covers 58 and 59 slide down by their own weight. To insure a positive movement, the bottom of covers 58 is provided with angle 65, by means of which floor covers 1 or frame 2 pull cover 58 down till bars 66 and 67 meet, when both covers 58 and 59 must follow the lowering of floor covers 1 or frame 2. In their lowest position, covers 44 and 45 form again a wide angle with each other, caused by the extension of strap 48. Covers 44 and 45 are pushed toward slats 6, and the latches 57 turned so that they engage with the shapes forming grooves 5, as shown by Figs. 19 and 20, thereby locking sheets 44 and 45 in a vertical position to the permanent sides of a stock car.

Latches 57 turn within the side covers to which they are attached. To prevent the opening of them while the car is in motion, springs 68 with square blocks 69 are provided. Blocks 68 fit into the square holes of the latches 57 and prevent them from turning. One turn of ninety degrees will either connect or disconnect latches 57 to or from the permanent sides of a stock car. To make a turn in either direction, key 70 is pushed into the square hole of latch 57, thereby pushing the spring block 69 out of the hole, permitting the latch 57 to be turned, after which key 70 is withdrawn when block 69 enters the hole of latch 57 again and holds the latch in the desired position.

It is obvious that by removing all inside coverings used for shipping freight within a stock car, from coming in contact with the animals shipped in a stock car, all surfaces will remain perfectly clean. But for certain freight, such as cotton and lumber, the only requirement is to have a car tight against sparks and rain, and no demand is made for particular cleanliness. In such cases a modified form of sliding covers for the sides and ends of a stock car may be used, as shown by Fig. 21. As many sliding covers 71 as there are spaces between slats 6 of a stock car, are connected to separating bars 72, which have at their ends lugs 73 and 74, covers 71 moving within grooves of suitable shape. These covers 71 lower themselves by their own weight and thereby close the spaces between slats 6. But they are besides kept closed by the floor covers 1 or frame 2 resting upon lugs 73. To raise covers 71, floor covers 1 or frame 2 are raised by turning the cranks 29 until floor covers 1 and frame 2 reach lugs 74 and are further raised to the limit travel of covers 71.

A device shown by Figs. 1, 3 and 4 for holding the entire inside covering in its highest position and for preventing the swinging of the weight of the inside covering suspended on the flexible members 7, consists of a shaft 75 upon which are rigidly mounted any desired number of brackets 76, which with the lever 77 at one end of shaft 75 hang by their own weight toward the inside of the car, being held by stops 78, as shown by full lines, and which take the position shown by dotted lines by raising lever 77 by pulling the flexible member 79, which is connected to the end of lever 77 and passes over a sheave or pulley 80. When floor covers 1 or frames 2 are raised and pass the brackets 76, the latter are pushed back in the position shown by dotted lines, falling forward again in the position shown by full lines as soon as floor covers 1 or frame 2 have passed the most projecting point of brackets 76. The lowering of floor covers 1 or frame 2 slightly, places the entire weight of the complete inside covering upon brackets 76, permitting the release or removal for repairs of the pulling arrangement and lifting mechanism. For lowering the inside covering, the same is first raised slightly to free brackets 76, which are then turned back by pulling the flexible member 79 and fastening same to hook 81.

Figures 22, 23:
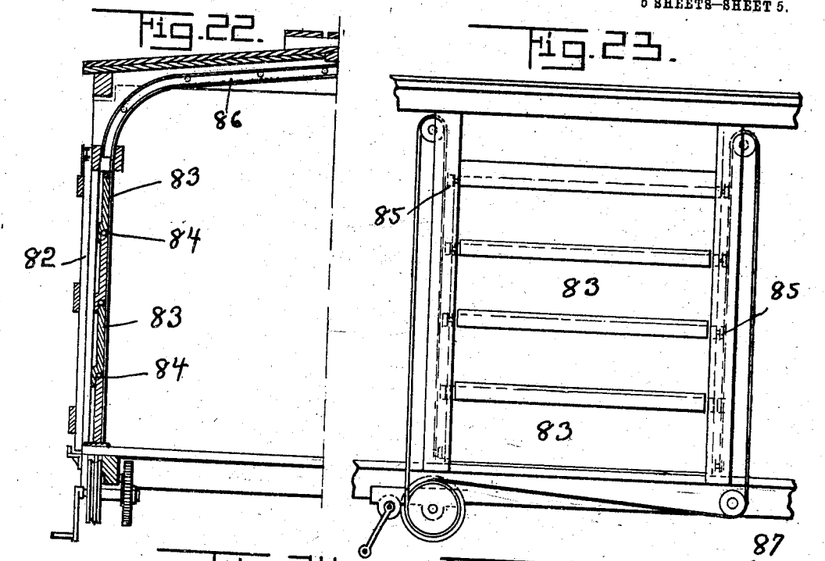
Figures 24, 26, 27, 28:
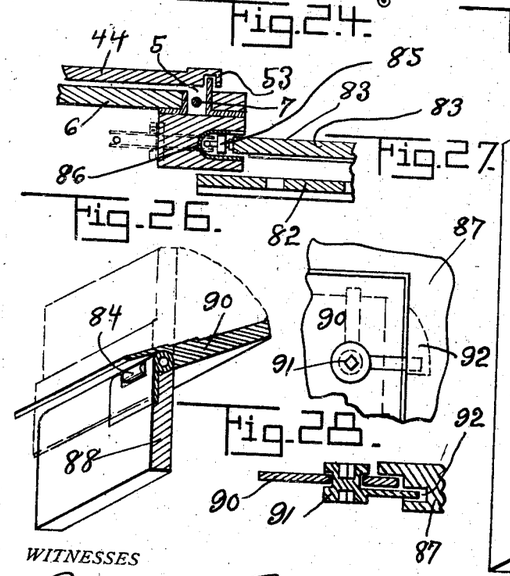
Figure 25:
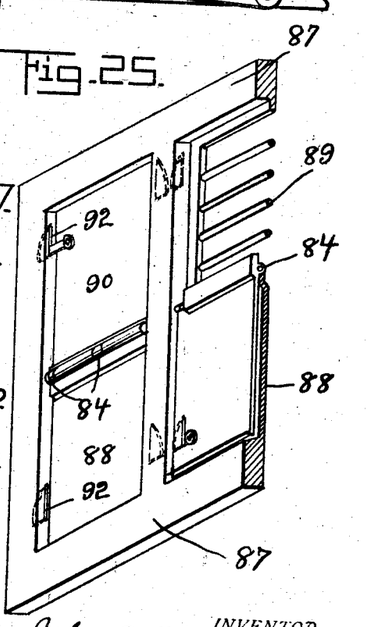
Fig. 25 is an elevation with vertical section of another form of a convertible door for a stock car.

*Doors.*—Ordinary solid doors may be used for both services, freight and live stock shipping. But if an exchange of the inner surfaces is required combination doors must be provided as shown by Figs. 22 to 28 inclusive. An ordinary open door 82 may be used for stock shipments, and a special rolling door be provided for freight. Special shaped sheets 83, connected by hinges 84, and each sheet provided with a roller 85 at each top corner, form a flexible rolling door which slides within vertical grooves 86, which extend underneath the roof of the car. Sheets 83 may be lifted by hand or by a suitable lifting mechanism as indicated by Figs. 22, 23 and 24. To dispense with two sets of doors, a convertible door sliding along the outside of a stock car in the ordinary way, may be used. The lower part of door frame 87 is covered on the outside with sheets 88, and the upper part is provided with permanent bars 89 and covers 90 which turn on hinges 84, being fastened in either position by latches 91. When the door is used for a stock car, covers 90 hang within the space formed by the thickness of the frame 87 and outside sheets 88. When the door is used for freight, covers 90 are turned up, placed against bars 89 and locked by latches 91 which engage in slots 92. In either position covers 90 take up no more space than the thickness of frame 87, thereby leaving nothing in the way which could prevent the sliding of the door in the ordinary way. The inner surfaces of covers 90, used for a stock car, are turned toward the outside while used for a freight car, thereby securing perfectly clean surfaces of sheets 88 and covers 90 while they are used for a freight car.

What I claim as new is:

1. In a convertible stock car having a permanent floor and permanent slatted walls, the combination of sectional means for closing and opening the open spaces between the slats of said walls, a temporary floor structure adapted to engage and lift said sectional means, flexible members connected to said floor structure and extending to the top of said permanent walls, and mechanical means located underneath the said permanent floor and connected to said flexible members for lifting said floor structure.

2. In a convertible stock car having a permanent floor and permanent side and end walls, the combination of a temporary floor in sections, temporary folding side walls in sections hinged together and hinged to said temporary floor and also hinged to the top of said permament side walls, temporary sliding end walls, flexible members attached to said temporary sectional floor and suspended from the upper part of the car, and means for elevating and lowering said temporary floor, folding side walls and sliding end walls simultaneously, said means located underneath the said permanent floor.

3. In a convertible stock car having a permanent floor and permanent end and side walls with a door way in each side wall, the combination of a temporary floor in sections, temporary folding side walls in sections hinged together and hinged to said temporary floor sections and also hinged to the top of said permanent side walls, temporary sliding end walls in sections and means for guiding said sliding end walls in a vertical position, means for operating said sliding end walls, guide blocks attached to said temporary floor sections, flexible members attached to said guide blocks and suspended from the top of said permanent side walls, guide ways attached to said permanent side walls for guiding said guide blocks and flexible members in a vertical position, means located underneath said permanent floor for elevating and lowering said temporary floor, temporary folding side walls and sliding end walls simultaneously, and an automatically engaging safety device for holding said temporary floor sections, folding side walls and sliding end walls in their highest elevated position.

4. In a convertible stock car having a permanent floor and permanent side and end walls with a door way in each side wall, the combination with guide ways attached to said permanent end and side walls, sheaves attached to said permanent side walls and a casing attached to the underframe of said stock car underneath the said permanent floor, a temporary sectional floor with guide blocks, flexible members attached thereto, said guide blocks and flexible members sliding vertically within said guide ways attached to said permanent side walls, sheaves attached to said permanent side walls, and over which said flexible members pass, a flexible main member for each side of a section of said temporary floor, and to which a plurality of said flexible members are connected, said flexible main members extending through said permanent floor into said casing, temporary folding side walls in sections hingedly connected together and hingedly connected to said temporary floor sections and also to said permanent side walls, temporary sliding end walls in sections sliding within said guide ways attached to said permanent end walls, means for operating said sliding end walls by said temporary floor sections, means in said casing for elevating and lowering said temporary floor sections simultaneously with said folding side wall sections and with said sliding end wall sections, and means for securing said temporary floor sections, folding side wall sections and sliding end wall sections underneath the roof of said stock car in their highest elevated position.

5. In a convertible stock car having a permanent floor and permanent side and end walls, the combination with a temporary sectional floor, temporary sectional folding side walls and temporary sectional sliding end walls, closed guide ways vertically attached to said side walls, flexible members connected to said folding side walls, and passing through said guide ways and permanent floor, hoisting means located underneath said permanent floor and operatively connected to said members and, comprising a casing therefor located underneath the floor of said stock car, sheaves located in said main casing, a crosshead with internal screw thread on which the sheaves are carried, a screw carried by bearings and turning within said crosshead, a shaft passing through said casing and extending across the said car, and geared to said screw and provided with a crank at each end, said crosshead being guided horizontally within said main casing and moving forwardly and backwardly by turning said cranks gearing and screw.

6. In a convertible stock car having a permanent floor, permanent side and end walls, a permanent roof and a door way in each side wall, the combination of a temporary sectional floor, temporary sectional folding side walls and temporary sliding end walls, means placed underneath said permanent floor for raising and lowering said temporary floor and walls, means for automatically securing said temporary floor, side and end walls in their highest elevated position, comprising shafts mounted near said roof to each of said permanent side walls and extending from each post of said doorways to and through the said permanent end walls, a plurality of brackets mounted on each of said shafts, a lever mounted to the end of each of said shafts on the outside of said end walls, flexible members connected to the ends of said levers and extending outside of said end walls, and means for fastening said flexible members in any desired position to the lower part of the outside of said permanent end walls, said flexible members operating simultaneously the two shafts passing through one of the said permanent end walls, turning the said brackets outwardly for the release of said elevated temporary sectional floor, folding side walls and sliding end walls.

In testimony whereof, I affix my signature in presence of two witnesses.

JOHN CHARLES BERTSCH.

Witnesses:
F. N. SMITH,
H. B. D. JEWELL.

---

Copies of this patent may be obtained for five cents each, by addressing the "Commissioner of Patents, Washington, D. C."